(12) United States Patent
Hamanaka et al.

(10) Patent No.: US 7,138,002 B2
(45) Date of Patent: Nov. 21, 2006

(54) HONEYCOMB STRUCTURE AND PROCESS FOR PRODUCTION THEREOF

(75) Inventors: Toshiyuki Hamanaka, Suzuka (JP); Tadato Ito, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 339 days.

(21) Appl. No.: 10/484,407

(22) PCT Filed: Jul. 17, 2002

(86) PCT No.: PCT/JP02/07243

§ 371 (c)(1), (2), (4) Date: Jan. 21, 2004

(87) PCT Pub. No.: WO03/011427

PCT Pub. Date: Feb. 13, 2003

(65) Prior Publication Data

US 2004/0211164 A1  Oct. 28, 2004

(30) Foreign Application Priority Data

Jul. 31, 2001 (JP) .............................. 2001-232506
Jul. 3, 2002 (JP) .............................. 2002-194803

(51) Int. Cl.
*B01D 46/00* (2006.01)

(52) U.S. Cl. ...................... 55/523; 55/282.2; 55/282.3; 55/385.3; 55/484; 55/DIG. 5; 55/DIG. 10; 55/DIG. 30; 60/311; 428/116; 264/628; 264/630; 264/638; 264/DIG. 48

(58) Field of Classification Search ............... 55/282.2, 55/282.3, 385.3, 482, 484, 523, DIG. 10, 55/DIG. 30, DIG. 5; 60/297, 299, 311; 428/116, 428/117, 118, 188; 502/439; 264/628, 630, 264/631, DIG. 48, 638
See application file for complete search history.

(56) References Cited

U.S. PATENT DOCUMENTS

| 4,233,351 A * | 11/1980 | Okumura et al. ............ 428/116 |
| 4,335,783 A | 6/1982 | McBrayer et al. |
| 5,914,187 A * | 6/1999 | Naruse et al. ................. 55/523 |
| 2004/0123573 A1* | 7/2004 | Ichikawa et al. .............. 55/523 |

FOREIGN PATENT DOCUMENTS

EP  0 036 321 A1 *  9/1981

(Continued)

OTHER PUBLICATIONS

Gulati, Suresh T. "Strength and Thermal Shock Resistance of Segmented Wall-Flow Diesel Filters." *SAE Technical Papers 860008* International Congress and Exposition, Feb. 24-28, 1986, pp. 11-18.

*Primary Examiner*—Jason M. Greene
(74) *Attorney, Agent, or Firm*—Oliff & Berridge, PLC (57) ABSTRACT

There is provided a honeycomb structure in which the structure is not segmented, or a smaller number of segments are integrated to suppress a local temperature rise and to reduce breakage by thermal stress at the time of use, and a method of manufacturing the structure. There is disclosed a honeycomb structure 1 comprising: a large number of cells 3 partitioned by cell walls 2 and extending through an axial direction. A flow channel separator 6 is formed in the honeycomb structure 1. There is disclosed a method of manufacturing the honeycomb structure 1 in which the flow channel separator 6 is formed by extrusion. There is disclosed a method of manufacturing the honeycomb structure 1 in which the flow channel separator 6 is formed by clogging.

12 Claims, 12 Drawing Sheets

FOREIGN PATENT DOCUMENTS

| | | | |
|---|---|---|---|
| JP | A 56-129020 | | 10/1981 |
| JP | 57-191421 | * | 12/1982 |
| JP | A 57-191421 | | 12/1982 |
| JP | 60-43114 | * | 3/1985 |
| JP | A 60-43114 | | 3/1985 |
| JP | B2 61-51240 | | 11/1986 |
| JP | 6-86918 | * | 3/1994 |
| JP | 7-241422 | * | 9/1995 |
| JP | A 07-241422 | | 9/1995 |
| JP | A 8-28246 | | 1/1996 |
| JP | 2000-279729 | * | 10/2000 |
| JP | A 2000-279729 | | 10/2000 |

\* cited by examiner

SEALING METHOD

FIG. 8

SEALING METHOD

FIG. 9

INTEGRAL FORMING METHOD

COMPARATIVE EXAMPLE 1

FIG.11

INTEGRAL FORMING METHOD

FIG.12

INTEGRAL FORMING METHOD

FIG.13

SEALING METHOD

FIG.14(a)

COMPARATIVE EXAMPLE 2

FIG.14(b)

SEGMENT IN 58mm × 58mm

FIG.15

INTEGRAL FORMING METHOD

FIG.16

SEALING METHOD

FIG.17(a)

COMPARATIVE EXAMPLE 3

FIG.17(b)

SEGMENT IN 35mm × 35mm

HONEYCOMB STRUCTURE AND PROCESS FOR PRODUCTION THEREOF

TECHNICAL FIELD

The present invention relates to a honeycomb structure for use in a filter for capturing particulates in an exhaust gas of an internal combustion engine or a boiler, and a method of manufacturing the structure, particularly to a honeycomb structure which is hardly damaged by a thermal stress at the time of use and which can be manufactured by an economically advantageous process, and the method of manufacturing the structure.

BACKGROUND ART

A honeycomb structure has been used in a filter for capturing particulate in exhaust gas of an internal combustion engine or a boiler, particularly used in a filter for capturing diesel particulate (it is hereinafter referred to as DPF) or a substrate for purifying exhaust gas, or the like.

Figure 18A:
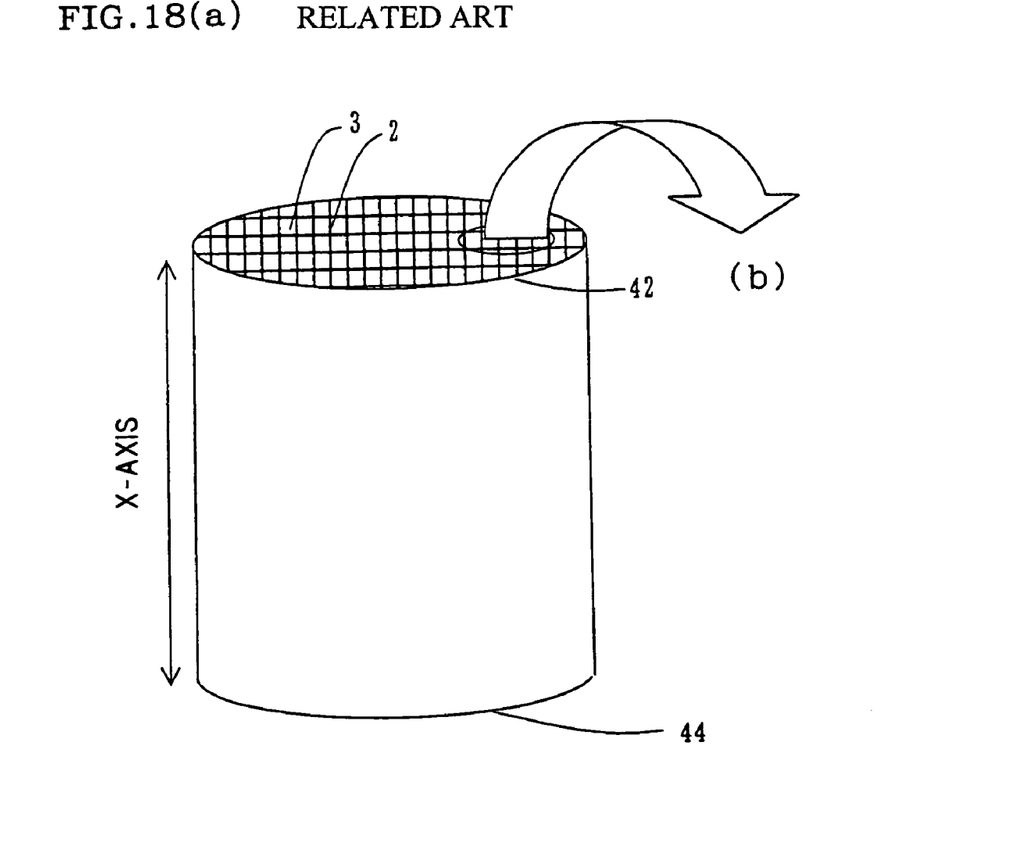
FIG. 18(a) is a schematic perspective view showing a conventional honeycomb structure.
Figure 18B:
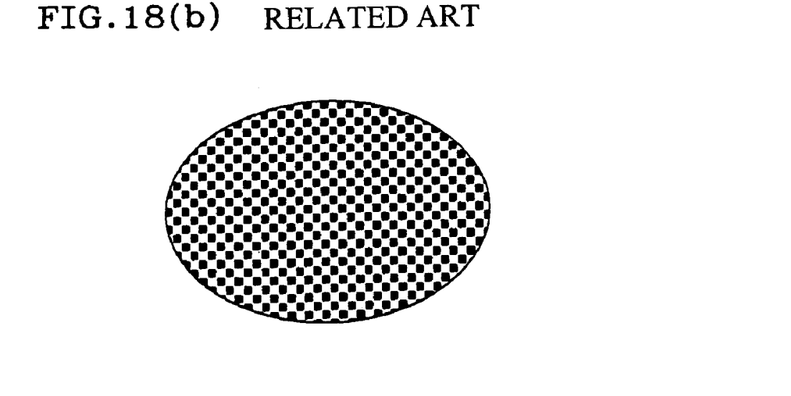
FIG. 18(b) is a partially enlarged top view of FIG. 18(a).

The honeycomb structure for use in this purpose, in general, includes a large number of cells 3 partitioned by cell walls 2 and extending through an X-axis direction as shown in FIGS. 18(a) and 18(b). Furthermore, the structure for the DPF usually includes a structure in which the cells 3 disposed adjacent to each other are alternately plugged at ends on opposite sides so that end surfaces form checkered patterns. In such a honeycomb structure, a fluid to be treated flows in the cell 3 not plugged at inflow end face 42, that is, plugged at outflow end face 44, passes through the porous cell walls 2, and is discharged via the adjacent cells 3, that is, the cell 3 plugged at the inflow end face 42 and not plugged at outflow end face 44. In this case, the cell walls 2 act as a filter. For example, soot discharged from a diesel engine is trapped by the cell walls and deposited on the cell walls. In a honeycomb structure used in such a way, the sharp temperature change of exhaust gas and the local heating of the structure make non-uniform the temperature distribution inside the structure and there have been problems such as crack generation in honeycomb structure and the like. When the honeycomb structure is used particularly as a DPF, it is necessary to burn the fine carbon particles deposited on the filter to remove the particles and regenerate the filter and, in that case, high temperatures are inevitably generated locally in the filter; as a result, a big thermal stress and cracks have tended to generate.

To solve the problem, a method of bonding a plurality of divided segments of the honeycomb structure by a bond material has been proposed. For example, in U.S. Pat. No. 4,335,783, a method for manufacturing a honeycomb structure is disclosed in which a large number of honeycomb members are bonded by discontinuous bond materials. Also in JP-B-61-51240 is proposed a thermal-shock resistant rotary regenerating thermal exchanging method which comprises forming, by extrusion, matrix segments of honeycomb structure made of a ceramic material, firing them, making smooth, by processing, the outer peripheral portions of the fired segments, coating the to-be-bonded areas of the resulting segments with a ceramic adhesive having, when fired, substantially the same chemical composition as the matrix segments and showing a difference in thermal expansion coefficient, of 0.1% or less at 800° C., and firing the coated segments. In SAE document 860008 of 1986, a ceramic honeycomb structure is disclosed in which the honeycomb segment of cordierite is similarly bonded with cordierite cement. Further in JP-A-8-28246 is disclosed a ceramic honeycomb structure obtained by bonding honeycomb ceramic members with an elastic sealant made of at least a three-dimensionally intertwined inorganic fiber, an inorganic binder, an organic binder and inorganic particles.

A method in which a plurality of segments divided in this manner are integrated to suppress a local temperature rise is an effective method. However, this requires a step of producing many segments and thereafter integrating these segments in order to manufacture one honeycomb structure, and this is not economically favorable especially in a case where the structure needs to be divided into a large number of segments.

The present invention has been developed in consideration of the situations, and an object thereof is to provide a honeycomb structure which is not segmented or is integrally constituted of a smaller number of segments to suppress a local temperature rise and to reduce damages by a thermal stress at the time of use, and a method of manufacturing the honeycomb structure.

DISCLOSURE OF THE INVENTION

According to the present invention, there is provided a honeycomb structure including a large number of cells partitioned by cell walls and extending through an axial direction, characterized in that a flow channel separator is formed.

In the present invention, at least an inflow port end is preferably sealed to form the flow channel separator. Moreover, for the honeycomb structure of the present invention, a thermal expansion coefficient at 20° C. to 800° C. is preferably $2 \times 10^{-6}/°$ C. or more. A plurality of honeycomb structural segments are integrated to constitute the honeycomb structure, and the flow channel separator is preferably formed in at least one of the honeycomb structural segments. Furthermore, the honeycomb structure preferably includes a honeycomb structural segment in which a sectional area of the cell in a vertical direction is 900 mm$^2$ to 10000 mm$^2$. Furthermore, a bonding material whose difference from the honeycomb structural segment in the thermal expansion coefficient is $1.5 \times 10^{-6}/°$ C. or less is used to bond and integrate the honeycomb structural segments. Furthermore, the honeycomb structure of the present invention is preferably formed of one or two or more materials selected from a group consisting of silicon nitride, silicon carbide, a silicon-silicon carbide based composite material, mullite, a silicon carbide-cordierite based composite material, and alumina.

Furthermore, according to the present invention, there is provided a method of manufacturing a honeycomb structure including a large number of cells partitioned by cell walls and extending through an axial direction, wherein a flow channel separator is formed, the method characterized by: forming the flow channel separator by extrusion.

Additionally, according to the present invention, there is provided a method of manufacturing a honeycomb structure including a large number of cells partitioned by cell walls and extending through an axial direction, wherein a flow channel separator is formed, the method characterized by: forming the flow channel separator by clogging.

BEST MODE FOR CARRYING OUT THE INVENTION

Contents of a honeycomb structure and a method of manufacturing the structure according to the present invention will hereinafter be described in accordance with examples of the honeycomb structure for DPF in detail with reference to the drawings, but the present invention is not limited to the following embodiment. Incidentally, in the following, "section" refers to a section vertical to the longitudinal direction of cells (X-axis direction) unless otherwise specified.

FIGS. 1(a) to 1(c) and FIGS. 2(a), (b) are schematic diagrams showing one embodiment of the honeycomb structure of the present invention. In FIGS. 1(a), 1(c) and FIGS. 2(a) to 2(c), an upper side constitutes an inflow port end 42, that is, an end of inflow of a fluid to be treated such as an exhaust gas. The honeycomb structure of the present invention includes a large number of cells 3 partitioned by cell walls 2 and extending through an axial direction. Further in the honeycomb structure for DPF shown in FIGS. 1(a) to 1(c) and FIGS. 2(a), 2(b), the cells 3 disposed adjacent to each other in ends 31 of cells are alternately clogged at ends on opposite ends by a clogging material 5. Important characteristics of the present invention lie in that a flow channel separator 6 is formed in the honeycomb structure. The flow channel separator is a layer which substantially prevents the fluid to be treated of one cell 3 from flowing into the other cell 3 or largely inhibits the flowing in the cells 3 disposed on opposite sides of the flow channel separator 6. It is to be noted that the flow channel separator in the present application is different from a bond layer formed for bonding a segmented/divided honeycomb structure, and the bond layer is excluded from the flow channel separator of the present application. When the flow channel separator 6 is disposed, the fluid is substantially prevented or inhibited from flowing via the flow channel separator 6, and a flow channel of the fluid to be treated is separated by the flow channel separator 6. Furthermore, the flow channel separator 6 constitutes an insulating layer, and inhibits heat from moving via the flow channel separator 6. When the flow channel separator has a sufficient heat capacity, the separator performs a function of absorbing combustion heat of soot or contributing to thermal diffusion to control rapid soot combustion. By these effects, chain combustion of the accumulated soot is inhibited, and thermal burn-up by explosive combustion of soot can be prevented, when the honeycomb structure of the present invention is used especially as the DPF. Since this effect is obtained by the flow channel separator, it is possible to reduce breakage by thermal stress without dividing the honeycomb structure into segments or with a smaller number of divisions. It is to be noted that the above-described effects of the flow channel separator are more effectively obtained, when the honeycomb structure is used as the DPF. However, needless to say, the effects of the present invention can also be obtained, for example, in other applications, for example, with the use as a catalyst carrier or another filter.

Figure 1A:
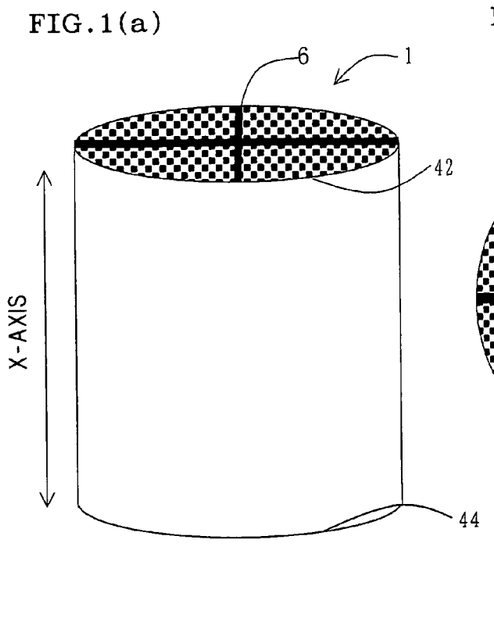
FIG. 1(a) is a schematic perspective view of a honeycomb structure of the present invention.
Figure 1B:
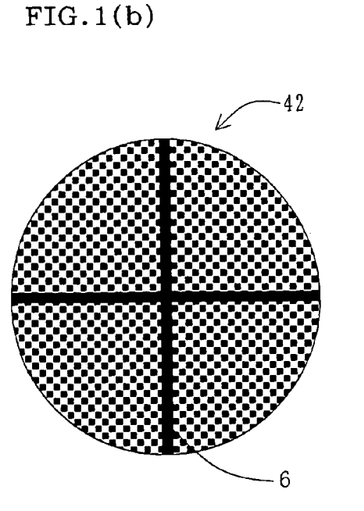
FIG. 1(b) is a schematic plan view.
Figure 1C:
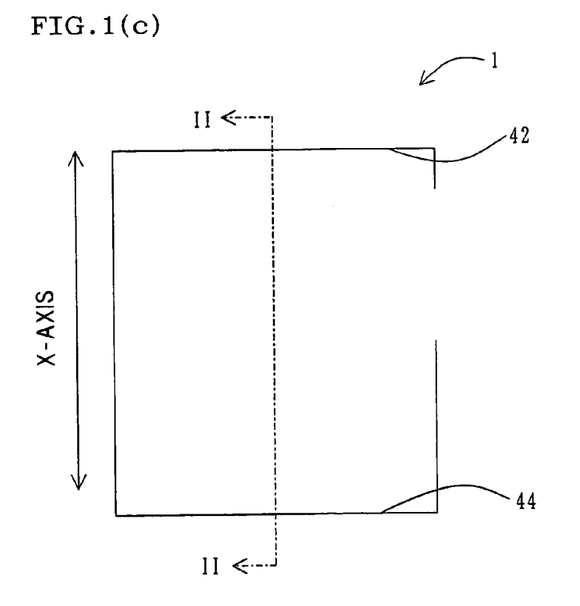
FIG. 1(c) is a schematic side view.
Figure 2A:
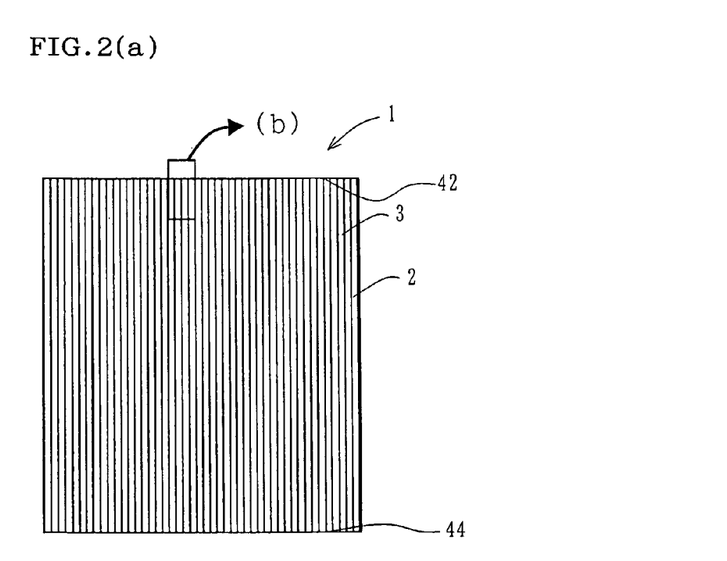
FIG. 2(a) is a schematic sectional view of a II—II arrow section in FIG. 1(c)
Figure 2B:
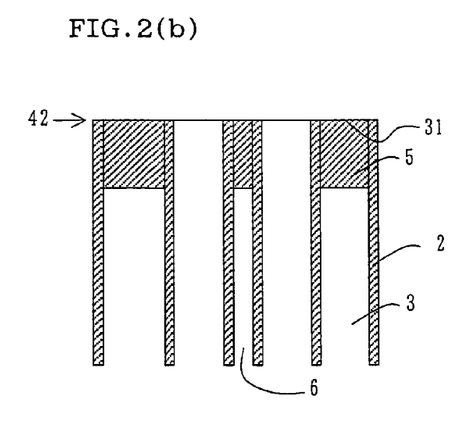
FIG. 2(b) is a partially enlarged view of FIG. 2(a)
Figure 2C:
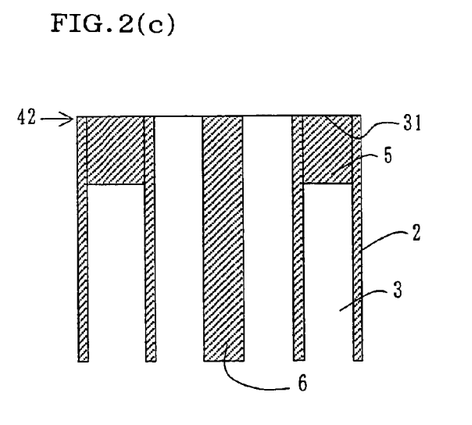
FIG. 2(c) is a partially enlarged view showing another embodiment of the present invention.

As shown in FIGS. 1(b) and 2(b), the inflow port end 42 can linearly be sealed to form the flow channel separator. In this case, a layer of air is formed in an X-axis direction along a line of the sealed flow channel separator 6 shown in FIG. 1(b), and this performs the function of the flow channel separator. In this case, it is also preferable to further seal an outflow port end 44 from the standpoint of insulation and an interrupting property of flow circulation. Furthermore, as shown in FIG. 2(c), a member of ceramic, and the like may also be charged over the X-axis direction to form the flow channel separator. Moreover, the member of ceramic, and the like may also be charged in a part of the X-axis direction to form the flow channel separator. In a case where the inflow port end 42 and preferably further the outflow port end 44 are sealed in order to form the flow channel separator 6, examples of the sealing material include a ceramic and/or a metal similar to materials suitable for the honeycomb structure described later. In this case, the material similar to that selected from these for actual use in the honeycomb structure is preferably used as the material of the sealing material. It is also possible to use the material different from that of the honeycomb structure in the sealing material. In this case, the thermal expansion coefficient may be approximated to that of the material of the honeycomb structure, and a difference in the thermal expansion coefficient is preferably set, for example, to $1 \times 10^{-6}/^\circ$ C. or less.

In the present invention, a width of the flow channel separator is not especially limited, but the effect of the present invention is not easily obtained with an excessively small width. With an excessively large width, a treatment capacity of the honeycomb structure decreases, or a soot reproduction efficiency with the use in the DPF drops, which is unfavorable. The width of the flow channel separator is preferably 300 µm to 3000 µm, more preferably 400 µm to 2000 µm, most preferably 500 µm to 1000 µm. This range is determined by a cell structure of the honeycomb structure for use, but the width is preferably larger than a cell wall thickness of the honeycomb structure by 50 µm or more.

Figure 3A:
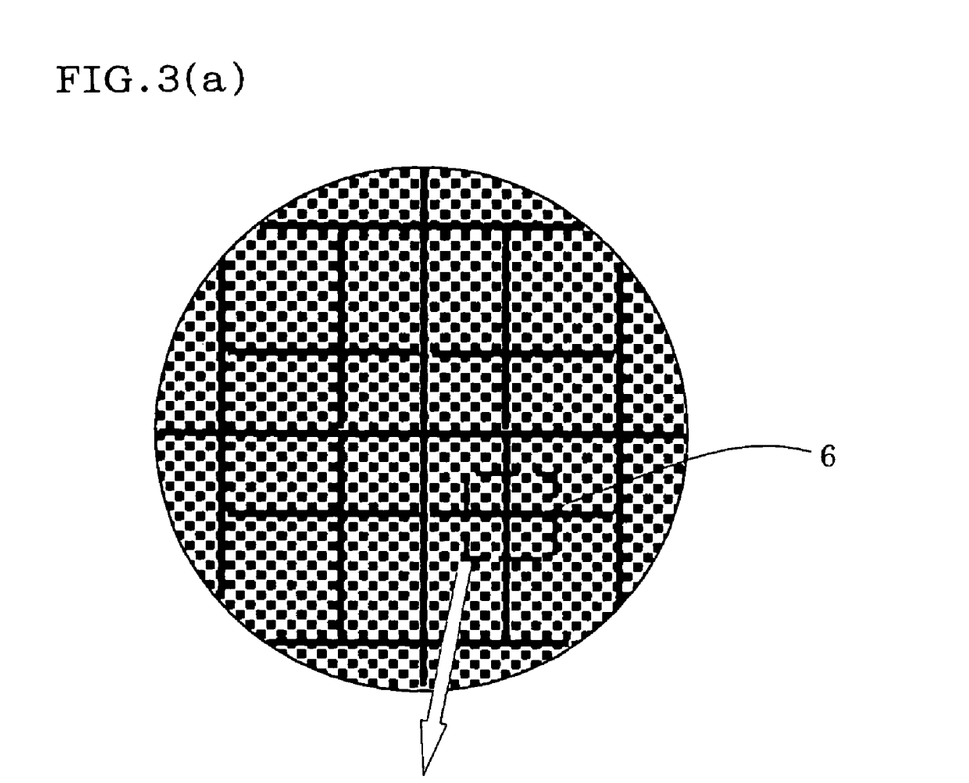
FIG. 3(a) is a schematic plan view in one embodiment of the honeycomb structure of the present invention.
Figure 3B:
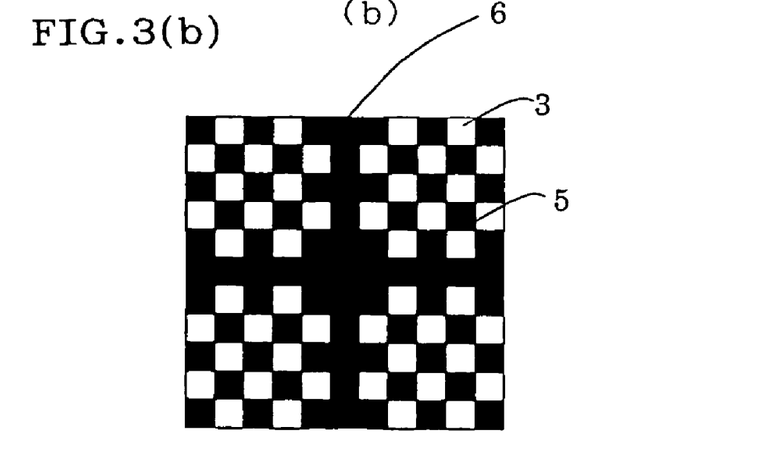
FIG. 3(b) is the enlarged view.
Figure 4A:
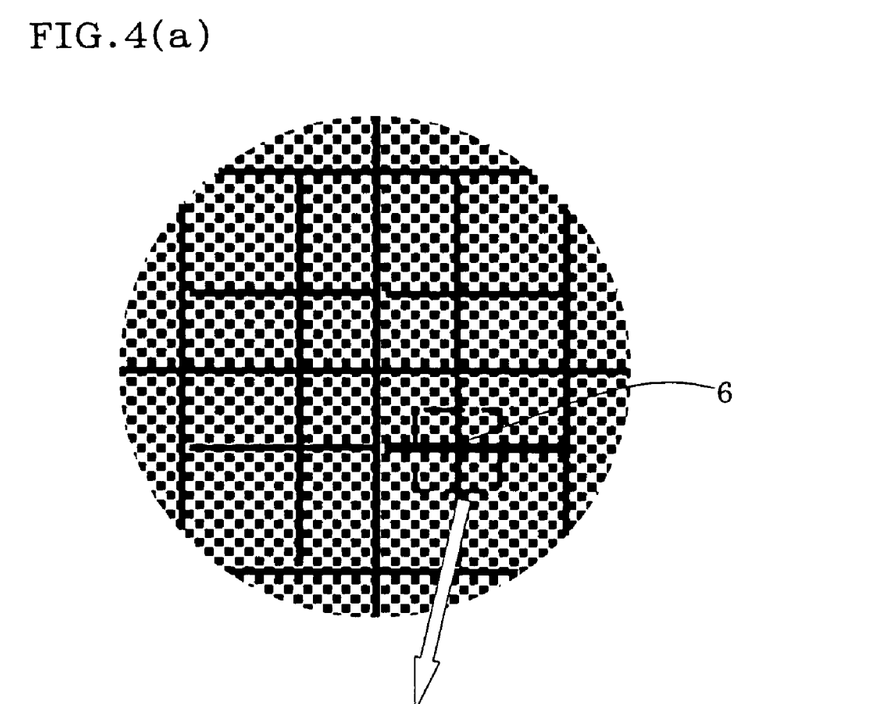
FIG. 4(a) is a schematic plan view in one embodiment of the honeycomb structure of the present invention.
Figure 4B:
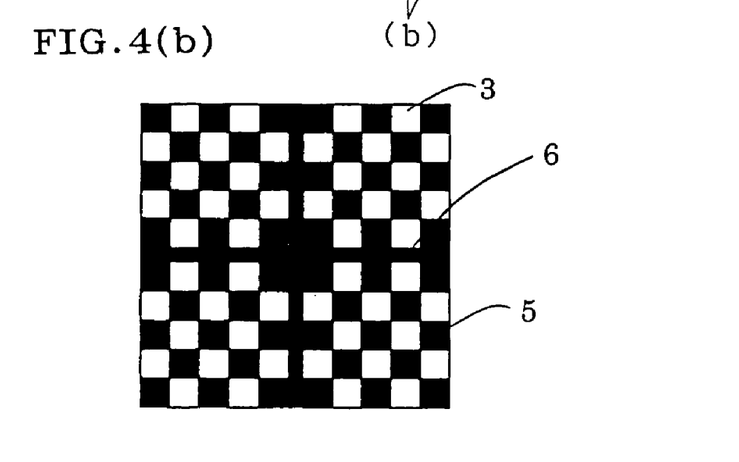
FIG. 4(b) is the enlarged view.

A length of the flow channel separator or the number of separators is not especially limited, and can be selected in a range in which the breakage by the thermal stress does not easily occur, the treatment capacity of the honeycomb structure hardly decreases, and the soot reproduction efficiency with the use in the DPF hardly drops by a person skilled in the art in accordance with a material, size, or application of the honeycomb structure. Additionally, from the standpoint of the insulating effect or the inhibition of chain reaction, as shown in FIGS. 3(a), 3(b), 4(a), and 4(b), the honeycomb structure is preferably partitioned into a plurality of structures by the flow channel separators. FIGS. 3(a) and 3(b) show the flow channel separator 6 formed by sealing through holes by a sealing process described later, and FIGS. 4(a) and 4(b) show the flow channel separator 6 formed by an integral forming method described later. Since a section central part of the honeycomb structure easily have a higher temperature, more flow channel separators 6 are preferably disposed in the central part.

The honeycomb structure of the present invention in which the flow channel separators 6 are formed is effective especially with a large thermal expansion coefficient. The honeycomb structure of the present invention is more effective, when the thermal expansion coefficient at 20° C. to 800° C. is preferably $2\times10^{-6}$/° C., more preferably $2.5\times10^{-6}$/° C., most preferably $3\times10^{-6}$/° C. Concretely, the present invention is especially effective in a honeycomb structure of a silicon carbide material or a silicon-silicon carbide composite material at a level of thermal expansion coefficient of $4\times10^{-6}$/° C.

Figure 5A:
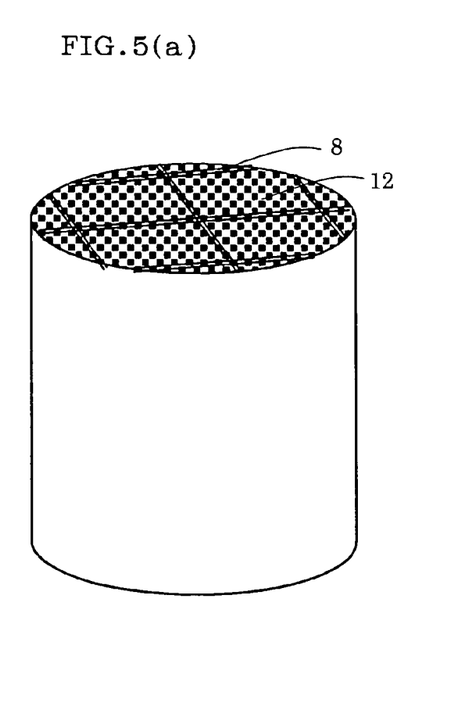
FIG. 5(a) and 5(b) are schematic perspective views showing one example of a segmented honeycomb structure.
Figure 5B:
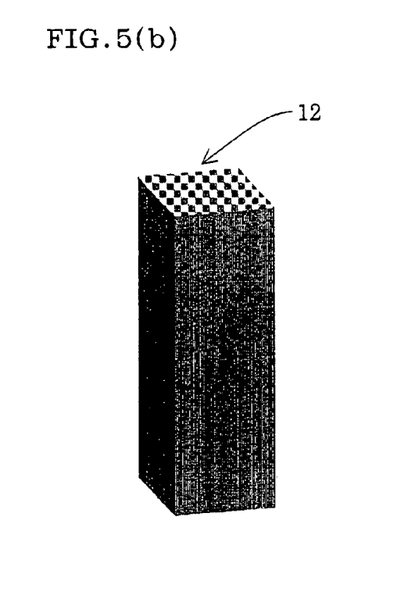
Figure 6A:
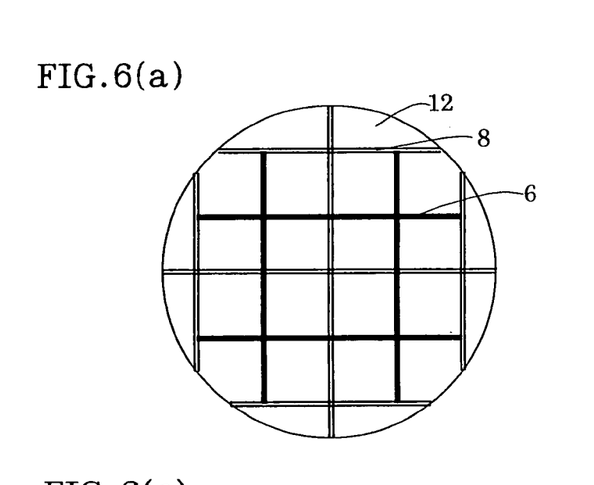
FIGS. 6(a), 6(b), 6(c), and 6(d) are schematic plan views each showing one embodiment of the honeycomb structure of the present invention.
Figure 6B:
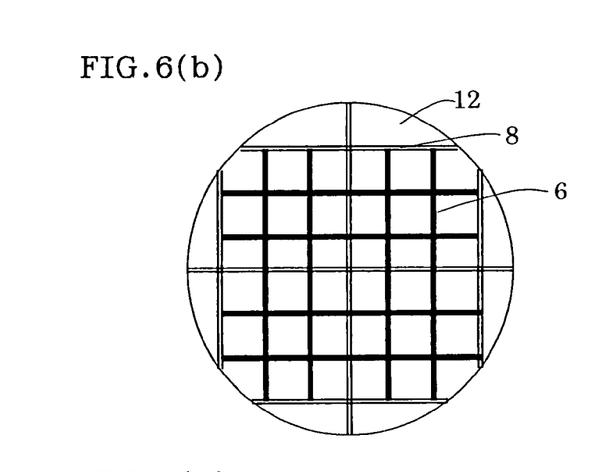
Figure 6C:
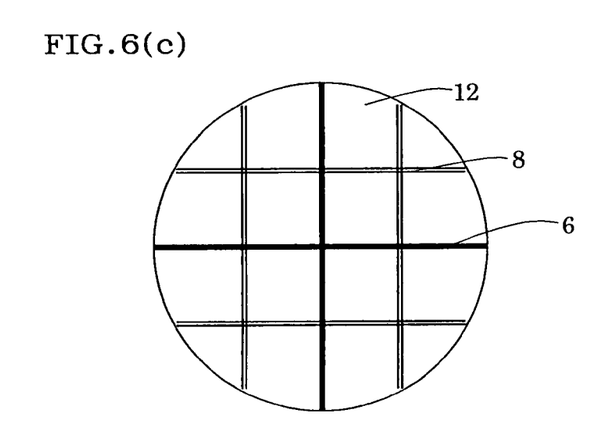
Figure 6D:
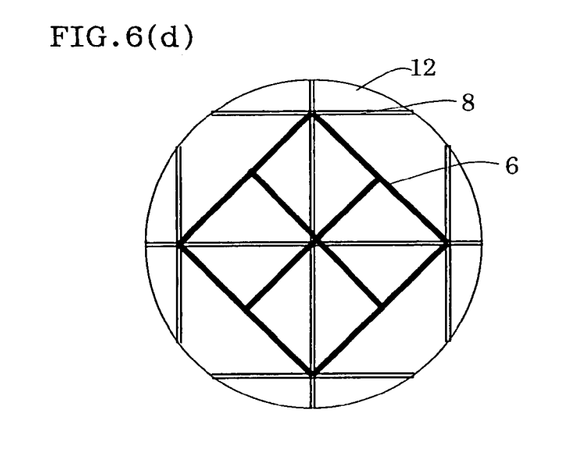

For the honeycomb structure of the present invention, as shown in FIGS. 5(a) and 5(b), a plurality of divided segments 12 may be bonded by a bonding material 8. In this case, the flow channel separator may be disposed in any of the divided segments 12, and various forms of flow channel separators 6 may be disposed as shown in FIGS. 6(a) to 6(d). When the flow channel separators are disposed in this manner, the breakage by the thermal stress can be prevented. Therefore, even in a case where it has heretofore been necessary to divide the structure into further smaller segments, the similar effect can be obtained without dividing the structure into the small segments. Also in this case, for the same reason as described above, the flow channel separators are reduced or are not disposed in the segments on an outer peripheral portion of the honeycomb structure, and more flow channel separators are preferably disposed in the segments in the central part.

As described above, a plurality of honeycomb segments are integrated using the bonding material 8. However, when the difference of the thermal expansion coefficient between the bonding material 8 and the honeycomb segment 12 is excessively large, the thermal stress is unfavorably concentrated onto a bonded portion at the time of heating/cooling. The difference of the thermal expansion coefficient between the bonding material and the honeycomb segment at 20° C. to 800° C. is preferably $1.5\times10^{-6}$/° C., more preferably $1\times10^{-6}$/° C., more preferably $0.8\times10^{-6}$/° C. or less. A preferable bonding material can be selected from the materials for use preferably as the major component of the honeycomb structure described later. Moreover, when the sectional area of each segment is excessively small, a necessity for the disposing of the flow channel separators of the present invention lowers. An excessively large sectional area is not preferable because the area of the separator is large with respect to the sectional area and a pressure loss increases. In the present invention, the sectional area of the honeycomb segment is preferably 900 mm$^2$ to 10000 mm$^2$, more preferably 950 mm$^2$ to 5000 mm$^2$, most preferably 1000 mm$^2$ to 2500 mm$^2$. A shape of the honeycomb segment is not especially limited, but a square pole shape shown in FIG. 5(b) is assumed to be a basic shape, and the shape of the honeycomb segment on the outer peripheral side can appropriately be selected in accordance with the shape of the honeycomb structure integrated as shown in FIG. 5(a).

In the present invention, from the standpoint of strength, heat resistance, and the like, major components of a honeycomb structure 1 preferably include at least one material selected from a group consisting of cordierite, mullite, alumina, spinel, silicon carbide, silicon carbide-cordierite based composite material, silicon-silicon carbide based composite material, silicon nitride, lithium aluminum silicate, aluminum titanate, Fe—Cr—Al based metal, and a combination of these. Silicon carbide or silicon-silicon carbide based composite material high in thermal conductivity is especially preferable in that heat is easily radiated. Especially, silicon carbide is preferable because heat is easily radiated, and is also suitable especially for the honeycomb structure of the present invention in that a measure for the thermal stress is required in a case where the thermal expansion coefficient is comparatively large and the temperature locally rises. Here, it is meant that the "major component" constitutes 50% by mass or more, preferably 70% by mass or more, further preferably 80% by mass or more of the honeycomb structure.

In the present invention, for the honeycomb structure formed of metal silicon (Si) and silicon carbide (SiC), when an Si content defined by Si/(Si+SiC) is excessively small, an effect of Si addition cannot be obtained. When the Si content exceeds 50% by mass, the effects of characteristics of SiC such as heat resistance and high thermal conductivity is hardly obtained. The Si content is preferably 5 to 50% by mass, further preferably 10 to 40% by mass.

In the present invention, the cell wall 2 of the honeycomb structure 1 is preferably a porous body which performs a function of a filter or a catalyst carrier as described above. A thickness of the cell wall 2 is not especially limited. However, when the cell wall 2 is excessively thick, the treatment capacity of the fluid to be treated drops or a large pressure loss is caused. When the cell wall 2 is excessively thin, the strength of the honeycomb structure becomes insufficient, and the excessive thickness is unfavorable. The thickness of the cell wall 2 is in a range of preferably 100 to 1000 µm, more preferably 150 to 750 µm, most preferably 250 to 500 µm.

In the honeycomb structure of the present invention, there is no particular restriction as to the sectional shape of cell (cell shape); however, the sectional shape is preferably any of a triangle, a tetragon, a hexagon and a corrugated shape from the standpoint of production. Moreover, a cell density, that is, the number of cells 3 (cells) per unit area on the section of the honeycomb structure 1 is not especially limited. However, when the cell density is excessively small, the strength or effective filter area of the honeycomb structure becomes insufficient. When the cell density is excessively large, the pressure loss increases in a case where the fluid to be treated flows.

The cell density is in a range of preferably 50 to 1000 cells/in.$^2$ (7.75 to 155 cells/cm$^2$), more preferably 75 to 500 cells/in.$^2$ (11.6 to 77.5 cells/cm$^2$), most preferably 100 to 400 cells/in.² (15.5 to 62.0 cells/cm²). The sectional shape of the honeycomb structure of the present invention is not especially limited, and any shape may be used such as a polygonal shape including an ellipse, an elongated circle, an oval, a substantial triangle, or a substantial tetragon, in addition to a circle.

When the honeycomb structure of the present invention is to be used as a catalyst substrate for purifying the exhaust gas of thermal engines such as an internal combustion engine or combustion apparatuses such as a boiler, or for modifying a liquid or gas fuel, a catalyst such as a metal having a catalytic capability is preferably loaded on the honeycomb structure of the present invention. Examples of a typical metal having the catalytic capability include Pt, Pd, Rh, and at least one of these is preferably loaded on the honeycomb structure.

In the honeycomb structure of the present invention, the cells 3 disposed adjacent to each other are preferably alternately clogged at ends on the opposite sides, so that the end surfaces 42 and 44 have checkered patterns, and the ceramic or the metal that can preferably be used in the above-described honeycomb structure can preferably be used in the material for use in the clogging.

Next, a method for manufacturing the honeycomb structure of the present invention will be described.

As a raw material powder of the honeycomb structure, the above-described preferable materials such as a silicon carbide powder are used. To the powder, binders such as methyl cellulose and/or hydroxypropoxyl methyl cellulose are added. Further a surfactant and water are added to prepare puddle having plasticity. When the puddle is extruded/molded, as shown in FIGS. 2(c), 4(a), and 4(b), the honeycomb structure is obtained including the flow channel separator into which the puddle is charged at a certain width, for example, at a width of 500 μm.

The honeycomb structure is dried, for example, by microwave and hot air. Thereafter, the cells 3 are plugged at one end alternately, with a material similar to that for use in manufacturing the honeycomb structure, so that the end faces have checkered patterns. The segment was dried further, then heated and degreased in, for example, an N₂ atmosphere, and fired in for example an Ar inert atmosphere, so that the honeycomb structure according to the present invention can be obtained. A method of forming the flow channel separator at the time of extrusion in this manner will hereinafter be referred to as an integral forming method.

Furthermore, in another method of manufacturing the honeycomb structure of the present invention, after preparing the puddle as described above, the puddle is extruded/molded to mold the honeycomb structure shown, for example, in FIGS. 18(a) and 18(b).

For example, this structure is dried by microwave and hot air, and thereafter the cells disposed adjacent to each other are alternately clogged at the ends on the opposite sides by the material similar to that used in manufacturing the honeycomb structure, so that end surfaces have the checkered patterns. In this case, as shown in FIGS. 2(b), 3(a), and 3(b), a series of consecutive through holes are sealed altogether, further dried, heated/degreased, for example, in an N₂ atmosphere, and thereafter fired in an inactive atmosphere of Ar, and the like. Accordingly, the sealed through holes continuously arranged in one row form the layer of the flow channel separator, and the honeycomb structure of the present invention can be obtained. A method of forming the flow channel separator by the sealing after the molding will hereinafter be referred to as a sealing method. In this case, the through holes for forming the flow channel separator may have shapes different from those of the usual cells, and are preferably narrowed beforehand as compared with the other cells, for example, as shown in FIG. 2(b).

When a plurality of segments are integrated to manufacture the honeycomb structure of the present invention, the honeycomb segments are prepared, for example, in any of the above-described methods. The honeycomb segments are bonded, for example, using a ceramic cement containing ceramic fiber and ceramic as the major components in the bonding material, thereafter dried, and fired in the same manner as described above so that the honeycomb structure of the present invention can be obtained.

For the honeycomb structure manufactured in such various ways, a method for loading a catalyst may be a method usually carried out by a person skilled in the art. For example, the catalyst can be loaded on the structure by wash-coating of the catalyst slurry, subsequently drying and firing.

The present invention will be described hereinafter in further detail based on examples, but the present invention is not limited to these examples.

EXAMPLE 1

Figure 7:
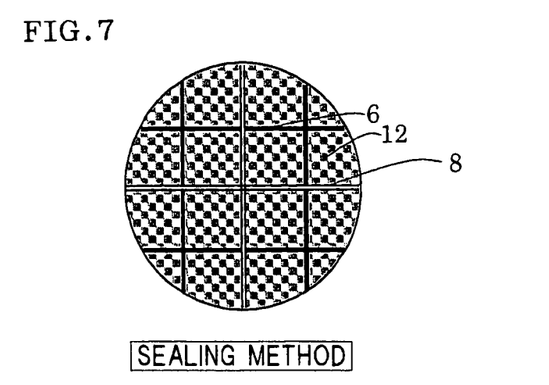
FIG. 7 is a schematic top view of the honeycomb structure produced in Example 1.

As a raw material, a mixed powder containing 80% by mass of SiC powder and 20% by mass of metal Si powder was used. To the powder, methyl cellulose, hydroxypropoxyl methyl cellulose, surfactant, and water were added to prepare the puddle having plasticity. This puddle was subjected to extrusion molding, the extrudate was dried using a microwave and hot air to obtain a honeycomb segment having a cell wall thickness of 380 μm, a cell density of 200 cells/in.² (31.0 cells/cm²), a fun-shaped section which is ¼ of a circle of 144 mm in diameter and a length of 152 mm. In this case, to alternately clog the adjacent cells at the ends on the opposite sides with the material similar to that used in manufacturing the honeycomb structure so that the end surfaces have the checkered patterns, as shown in FIG. 7, the cells continuously arranged in one row are sealed together as shown in FIG. 7, dried, thereafter degreased in an N₂ atmosphere at 400° C., and thereafter fired in an Ar inactive atmosphere at about 1550° C. to obtain the segments of the honeycomb structure. The obtained four segments were bonded using a mixture of aluminosilicate, silicon carbide powder, silica sol, and inorganic binder, and dried/hardened at 200° C. to obtain a columnar honeycomb structure for the DPF. Characteristics of the obtained honeycomb structure are shown in Table 1.

TABLE 1

| Composition | SiC80%, Si20% |
| --- | --- |
| Thermal expansion coefficient ($\times 10^{-6}/°$ C.) | 4.1 (40 to 800° C.) |
| Porosity (%) | 45 |
| Average pore diameter (μm) | 12 |
| Thermal conductivity | 20 |
| Bend strength (MPa) | 20 |

EXAMPLE 2

Figure 8:
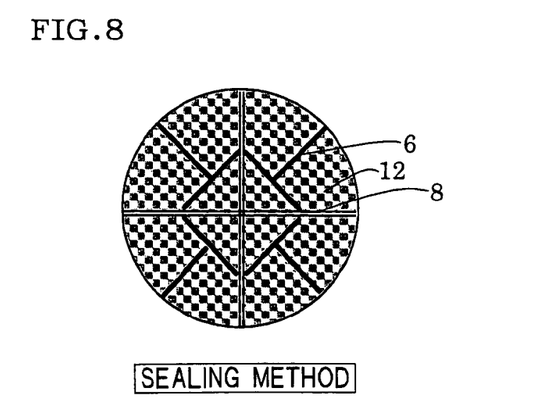
FIG. 8 is a schematic top view of the honeycomb structure produced in Example 2.

A columnar honeycomb structure for DPF including the flow channel separator shown in FIG. 8 and having the same size as that of the structure obtained in Example 1 was prepared in the same manner as in Example 1.

EXAMPLE 3

Figure 9:
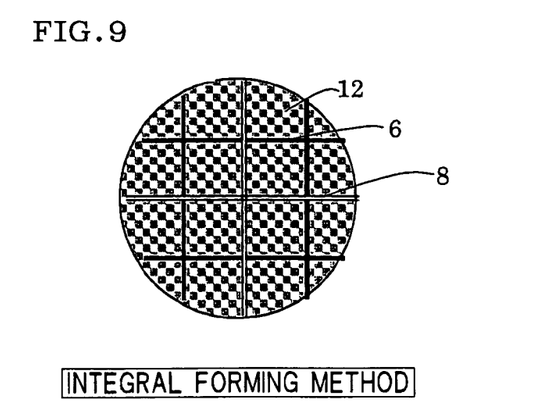
FIG. 9 is a schematic top view of the honeycomb structure produced in Example 3.

The puddle was prepared in the same manner as in Example 1, and an integral extruded/molded material (non-segmented molded material) including a cross-shaped 500 μm flow channel separator shown in FIG. 9 was molded (integral forming method). The material was dried, clogged, degreased, and fired in the same manner as in Example 1 except that the sealing method was not used, and the columnar honeycomb structure for DPF having the same size as that of the structure obtained in Example 1 was obtained.

COMPARATIVE EXAMPLE 1

Figure 10A:
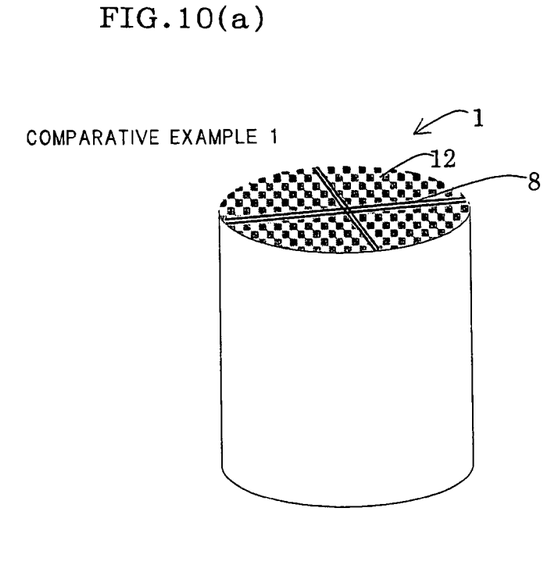
FIG. 10(a) is a schematic perspective view of the honeycomb structure produced in Comparative Example 1.
Figure 10B:
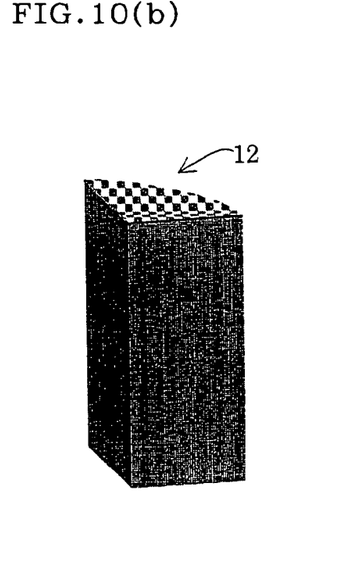
FIG. 10(b) is a schematic perspective view of the segment.

The columnar honeycomb structure for DPF having the same size as that of the structure obtained in Example 1 as shown in FIGS. 10(a) and 10(b) was obtained in the same materials and methods as those of Example 1 except that the flow channel separator was not disposed.

EXAMPLE 4

Figure 11:
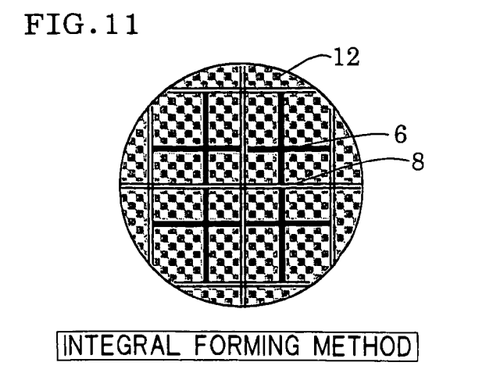
FIG. 11 is a schematic top view of the honeycomb structure produced in Example 4.

The honeycomb structure for DPF was obtained in the same materials and methods as those of Example 1 except that a segment having a square sectional shape with one side of 58 mm as shown in FIG. 11 was used as a basic segment and the flow channel separator having a width of 500 μm was formed by the integral forming method shown in FIG. 2(c).

EXAMPLE 5

Figure 12:
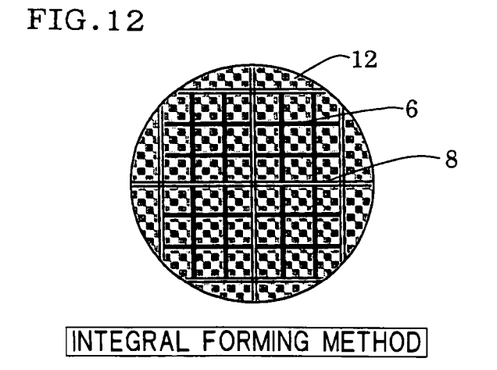
FIG. 12 is a schematic top view of the honeycomb structure produced in Example 5.

The columnar honeycomb structure for DPF having the same size as that of the structure obtained in Example 4 was obtained in the same materials and methods as those of Example 4 except that the flow channel separator having a width of 500 μm was formed as shown in FIG. 12.

EXAMPLE 6

Figure 13:
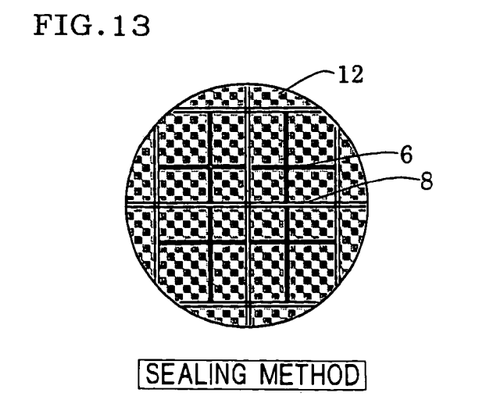
FIG. 13 is a schematic top view of the honeycomb structure produced in Example 6.

The columnar honeycomb structure for DPF having the same size as that of the structure obtained in Example 4 was obtained in the same materials and methods as those of Example 4 except that the flow channel separator was formed by the sealing method as shown in FIG. 13.

COMPARATIVE EXAMPLE 2

Figure 14A:
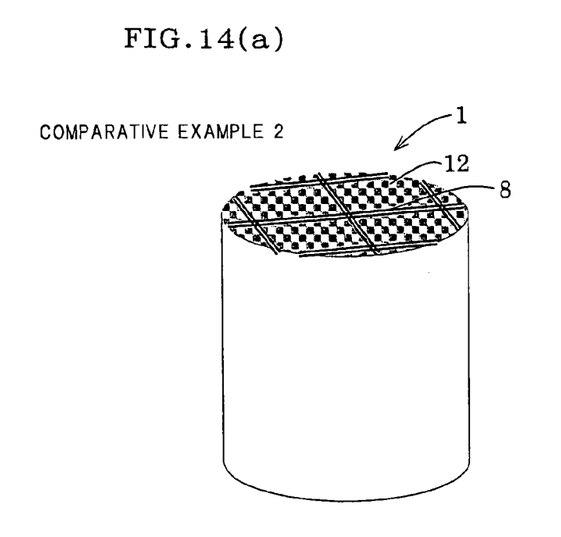
FIG. 14(a) is a schematic perspective view of the honeycomb structure produced in Comparative Example 2.
Figure 14B:
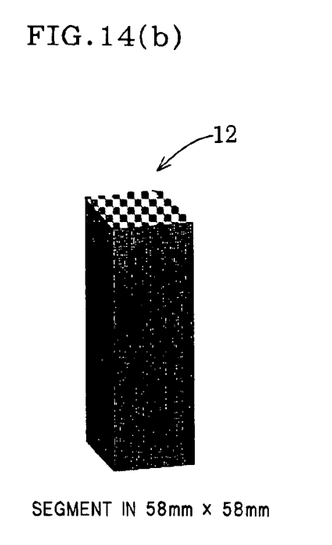
FIG. 14(b) is a schematic perspective view of the segment.

As shown in FIGS. 14(a) and 14(b), the columnar honeycomb structure for DPF having the same size as that of the structure obtained in Example 4 was obtained in the same materials and methods as those of Example 4 except that the flow channel separator was not disposed.

EXAMPLE 7

Figure 15:
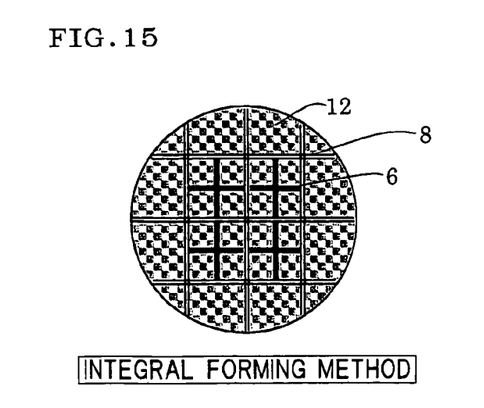
FIG. 15 is a schematic top view of the honeycomb structure produced in Example 7.

The honeycomb structure for DPF was obtained in the same materials and methods as those of Example 1 except that the segment having a square sectional shape with one side of 35 mm was used as the basic segment as shown in FIG. 15 and the flow channel separator having a width of 500 μm was formed by the integral forming method as shown in FIG. 2(c).

EXAMPLE 8

Figure 16:
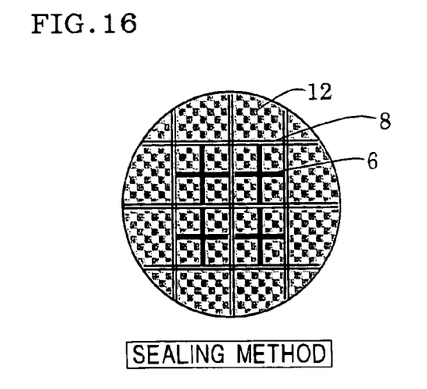
FIG. 16 is a schematic top view of the honeycomb structure produced in Example 8.

The columnar honeycomb structure for DPF having the same size as that of the structure obtained in Example 7 was obtained in the same materials and methods as those of Example 7 except that the flow channel separator was formed in the sealing method as shown in FIG. 16.

COMPARATIVE EXAMPLE 3

Figure 17A:
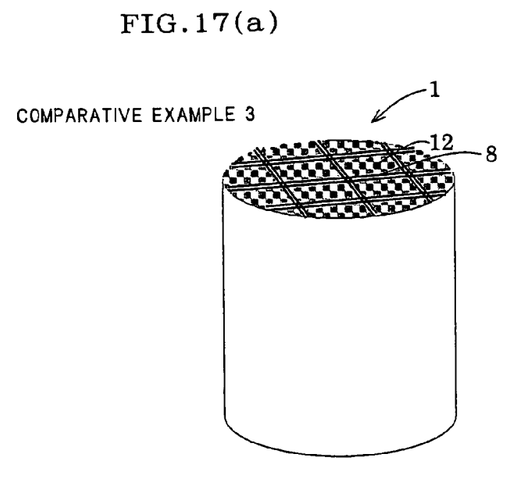
FIG. 17(a) is a schematic perspective view of the honeycomb structure produced in Comparative Example 3.
Figure 17B:
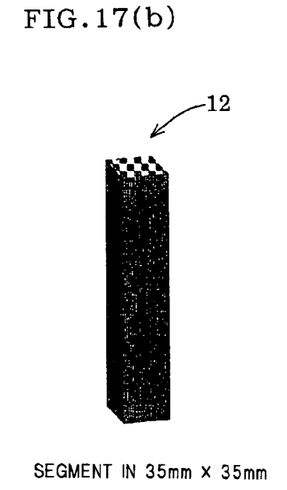
FIG. 17(b) is a schematic perspective view of the segment.

As shown in FIGS. 17(a) and 17(b), the columnar honeycomb structure for DPF having the same size as that of the structure obtained in Example 7 was obtained in the same materials and methods as those of Example 7 except that the flow channel separator was not disposed.

The honeycomb structures for DPF obtained in Examples 1 to 8 and Comparative Examples 1 to 3 were each connected to an exhaust tube of a direct-injection three-liter diesel engine, 30 ppm of a light oil containing a Ce fuel additive manufactured Rodea Co. was used to run the engine, and 5 g/liter of soot was accumulated in the honeycomb structure. Thereafter, an exhaust gas temperature was raised at 500° C. or more by post injection to subject the soot to a reproduction treatment. At this time, a maximum temperature on an outlet side in the DPF was measured, and it was checked with an optical solid microscope whether or not any crack was made in the DPF after the test. The result is shown in Table 2.

TABLE 2

| No. | Maximum temp. in DPF | Presence/absence of crack |
| --- | --- | --- |
| Comparative Example 1 | 980° C. | Present |
| Example 1 | 780° C. | Absent |
| Example 2 | 810° C. | Absent |
| Example 3 | 770° C. | Absent |
| Comparative Example 2 | 880° C. | Present |
| Example 4 | 748° C. | Absent |
| Example 5 | 708° C. | Absent |
| Example 6 | 750° C. | Absent |
| Comparative Example 3 | 765° C. | Absent |
| Example 7 | 695° C. | Absent |
| Example 8 | 715° C. | Absent |

In comparison of Comparative Example 1 with Examples 1 to 3, the honeycomb structure obtained in Comparative Example 1 had a high maximum temperature, and the cracks were generated. On the other hand, in the honeycomb structures obtained in Examples 1 to 3, the maximum temperature was controlled to be low, and any crack was not found. In comparison of Comparative Example 2 with Examples 5 to 6, the honeycomb structure obtained in Comparative Example 2 had a high maximum temperature, and the cracks were generated. On the other hand, in the honeycomb structures obtained in Examples 4 to 6, the maximum temperature was controlled to be low, and any crack was not found.

In comparison of Comparative Example 3 with Examples 7 and 8, in the honeycomb structure obtained in Comparative Example 3, any crack was not found, but the maximum temperature was high. On the other hand, in the honeycomb structures obtained in Examples 7 and 8, the maximum temperature was controlled to be low.

INDUSTRIAL APPLICABILITY

As described above, in a honeycomb structure of the present invention, since a flow channel separator is formed, the structure is not segmented, or a smaller number of segments are integrated, so that a local temperature rise is suppressed, and breakage by a thermal stress at the time of use does not easily occur. Furthermore, by the use of a method of manufacturing the honeycomb structure of the present invention, the flow channel separator can comparatively easily be formed.

The invention claimed is:

1. A honeycomb structure, comprising:
    a large number of cells partitioned by cell walls and extending through an axial direction, and
    a flow channel separator, the flow channel separator being an insulating layer that extends in the axial direction, separates one group of cells from another group of cells, substantially prevents a fluid that is to be treated by the honeycomb structure from flowing through the flow channel separator, and substantially prevents heat from passing through the flow channel separator.

2. The honeycomb structure according to claim 1, wherein at least an inflow port end is sealed to form the flow channel separator.

3. The honeycomb structure according to claim 1, wherein a thermal expansion coefficient at 20° C. to 800° C. is $2 \times 10^{-6}$/° C. or more.

4. The honeycomb structure according to claim 1, wherein a plurality of honeycomb structural segments are integrated to constitute the honeycomb structure, and the flow channel separator is formed in at least one of the honeycomb structural segments.

5. The honeycomb structure according to claim 4, wherein the honeycomb structure includes a honeycomb structural segment in which a sectional area of the cell in a vertical direction is in a range of 900 mm$^2$ to 10000 mm$^2$.

6. The honeycomb structure according to claim 4, wherein a bonding material whose difference from the honeycomb structural segment in the thermal expansion coefficient is $1.5 \times 10^{-6}$/° C. or less is used to bond and integrate the honeycomb structural segments.

7. The honeycomb structure according to claim 1, comprising: as a main component, one or two or more materials selected from a group consisting of silicon nitride, silicon carbide, a silicon-silicon carbide based composite material, mullite, a silicon carbide-cordierite based composite material, and alumina.

8. The honeycomb structure according to claim 4, comprising: as a main component, one or two or more materials selected from a group consisting of silicon nitride, silicon carbide, a silicon-silicon carbide based composite material, mullite, a silicon carbide-cordierite based composite material, and alumina.

9. A method of manufacturing the honeycomb structure according to claim 1 comprising a large number of cells partitioned by cell walls and extending through an axial direction, wherein a flow channel separator is formed, the method comprising: forming the honeycomb structure, and forming the flow channel separator by extrusion.

10. A method of manufacturing the honeycomb structure according to claim 4 comprising a large number of cells partitioned by cell walls and extending through an axial direction, wherein a flow channel separator is formed, the method comprising: forming the honeycomb structure, and forming the flow channel separator by extrusion.

11. A method of manufacturing the honeycomb structure according to claim 1 including a large number of cells partitioned by cell walls and extending through an axial direction, wherein a flow channel separator is formed, the method comprising: forming the honeycomb structure, and forming the flow channel separator by clogging.

12. A method of manufacturing the honeycomb structure according to claim 4 including a large number of cells partitioned by cell walls and extending through an axial direction, wherein a flow channel separator is formed, the method comprising: forming the honeycomb structure, and the flow channel separator by clogging.

* * * * *